United States Patent [19]

McDougal et al.

[11] Patent Number: 4,993,371
[45] Date of Patent: Feb. 19, 1991

[54] INTERNAL COMBUSTION ENGINE IGNITION SYSTEM AND CLEANING DEVICE

[75] Inventors: John A. McDougal, 2801 S. Port Hwy., A-4, Flint, Mich. 48507; John W. Lennington, Ypsilanti, Mich.

[73] Assignee: John A. McDougal, Detroit, Mich.

[21] Appl. No.: 460,289

[22] Filed: Jan. 3, 1990

Related U.S. Application Data

[60] Continuation of Ser. No. 310,837, Feb. 14, 1989, which is a continuation of Ser. No. 187,933, Apr. 29, 1988, Pat. No. 4,809,662, which is a continuation of Ser. No. 137,195, Dec. 23, 1987, abandoned, which is a division of Ser. No. 873,075, Jun. 2, 1986, Pat. No. 4,718,381, which is a continuation of Ser. No. 651,042, Sep. 14, 1984, abandoned, which is a continuation of Ser. No. 374,803, May 14, 1982, Pat. No. 4,471,737, which is a continuation of Ser. No. 161,282, Jun. 10, 1980, abandoned, which is a division of Ser. No. 934,322, Aug. 16, 1978, Pat. No. 4,257,373, which is a division of Ser. No. 800,959, May 26, 1977, Pat. No. 4,116,173, which is a continuation of Ser. No. 572,167, Apr. 28, 1975, abandoned, which is a division of Ser. No. 336,559, Feb. 28, 1973, Pat. No. 3,903,856.

[51] Int. Cl.$^5$ ............................................. F02P 5/155
[52] U.S. Cl. ..................................... 123/425; 123/435
[58] Field of Search ............... 123/415, 414, 416, 418, 123/425, 435; 73/35, 116

[56] References Cited

U.S. PATENT DOCUMENTS

| | | | |
|---|---|---|---|
| 2,220,558 | 11/1940 | Van Dijck et al. | 123/425 |
| 2,401,563 | 6/1946 | Hersey | 123/425 |
| 2,407,652 | 9/1946 | Costa | 123/425 |
| 2,470,709 | 5/1949 | MacMillan | 123/425 |
| 3,314,407 | 4/1967 | Schneider | 123/418 |
| 3,364,418 | 1/1968 | MacCrea | 123/415 X |
| 3,660,689 | 5/1972 | Oishi et al. | 123/415 X |
| 3,757,755 | 9/1973 | Carner | 123/414 |
| 3,785,356 | 1/1974 | Niemoeller | 123/415 |
| 3,811,420 | 5/1974 | Vogel | 123/415 |
| 3,875,912 | 4/1975 | Bullo | 123/425 |

*Primary Examiner*—Willis R. Wolfe
*Attorney, Agent, or Firm*—Harness, Dickey & Pierce

[57] ABSTRACT

An apparatus for electrically controlling the spark advance of selected cylinders of a multicylinder engine so that the spark of the selected cylinders is advanced beyond others of the cylinders. For example, the selected cylinders may be advanced beyond normal operational advance to increase combustion chamber temperatures and pressures for a relatively short period so as to clean the surfaces of the combustion chamber. The cylinders which are advanced are changed in sequence or at random so that all of the cylinders are cleaned. The system may also be used to control the spark advance of the cylinders to provide differing advances for the respective cylinders to accommodate differences in operational conditions at the cylinders.

5 Claims, 8 Drawing Sheets

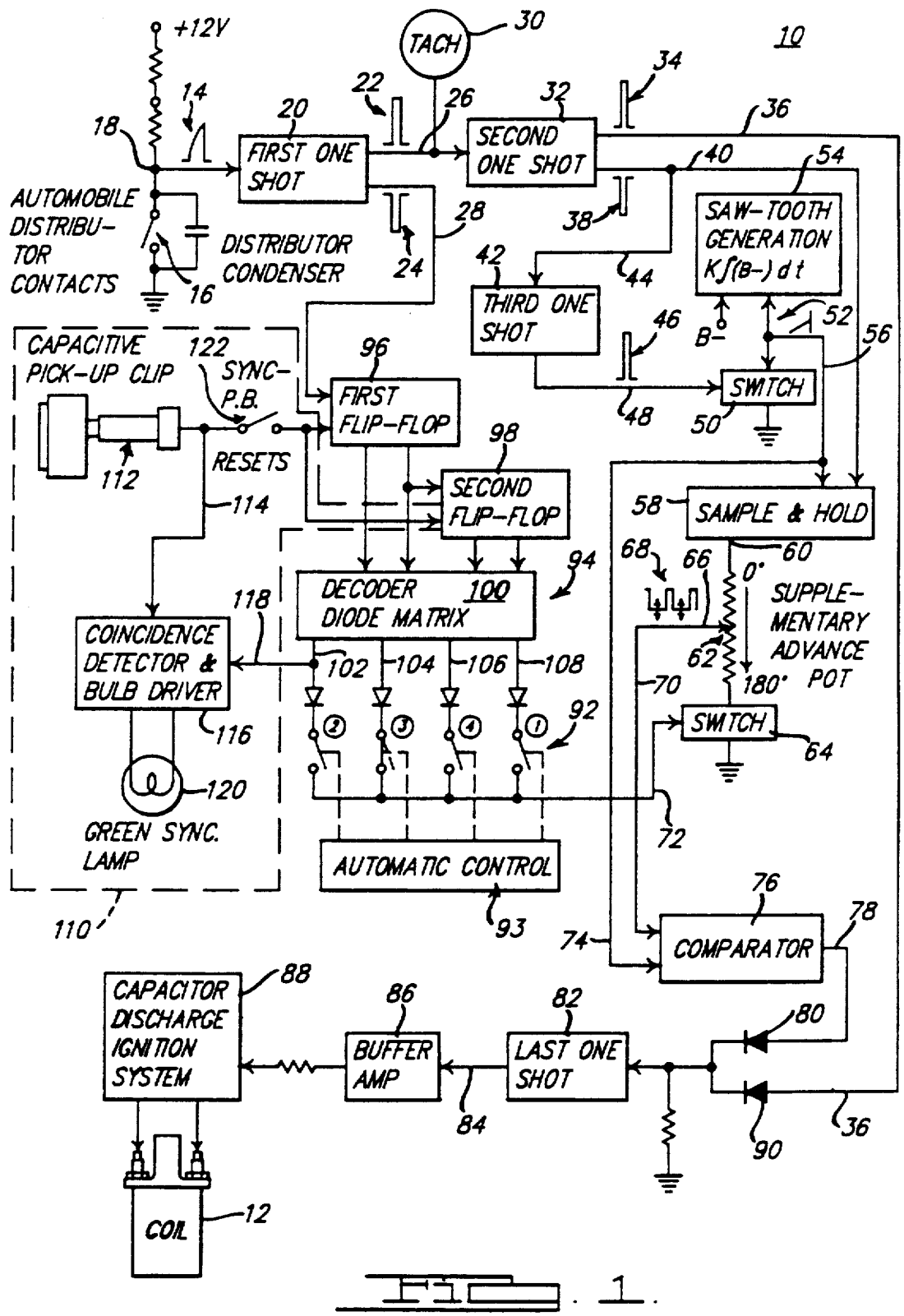

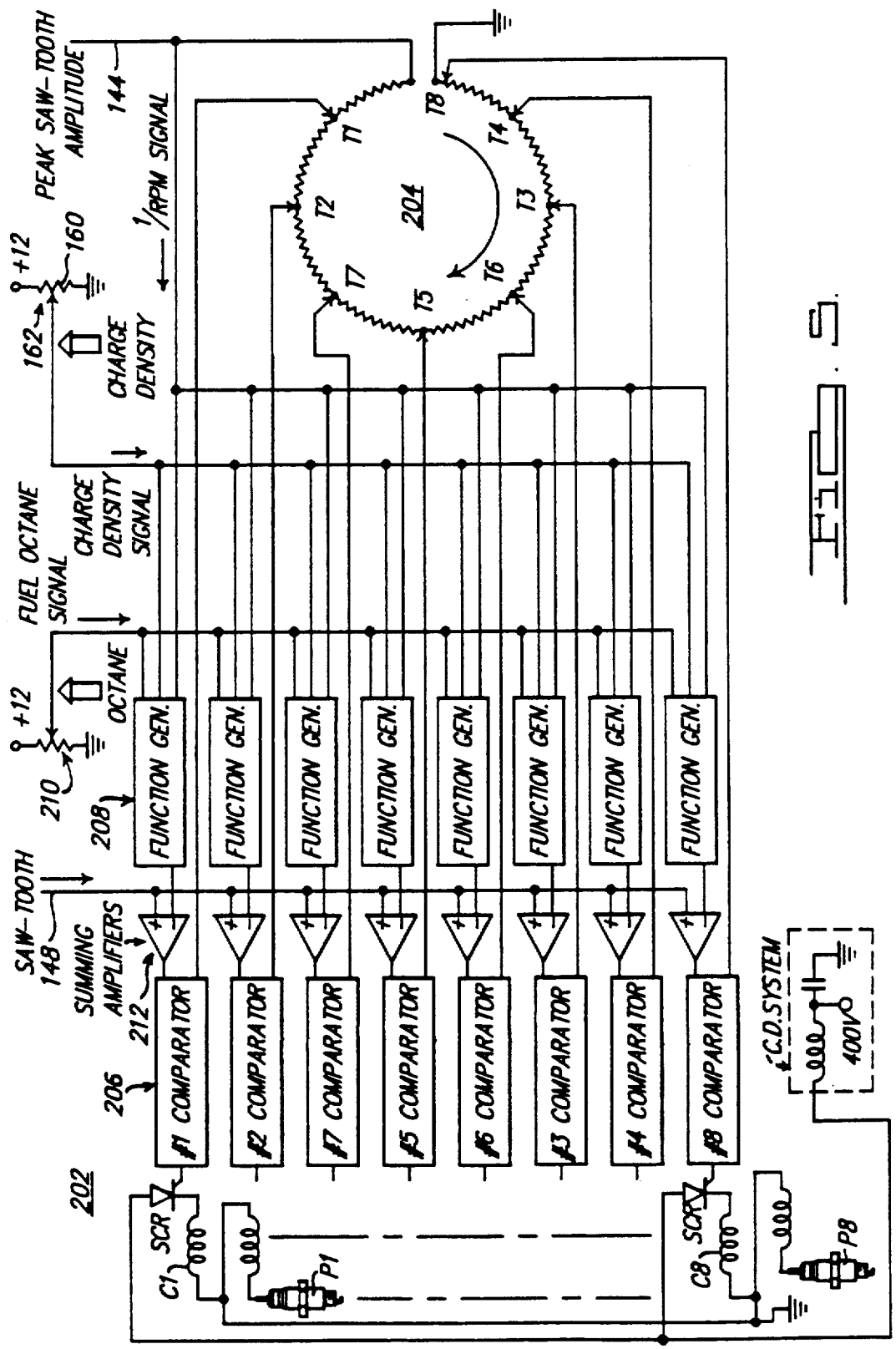

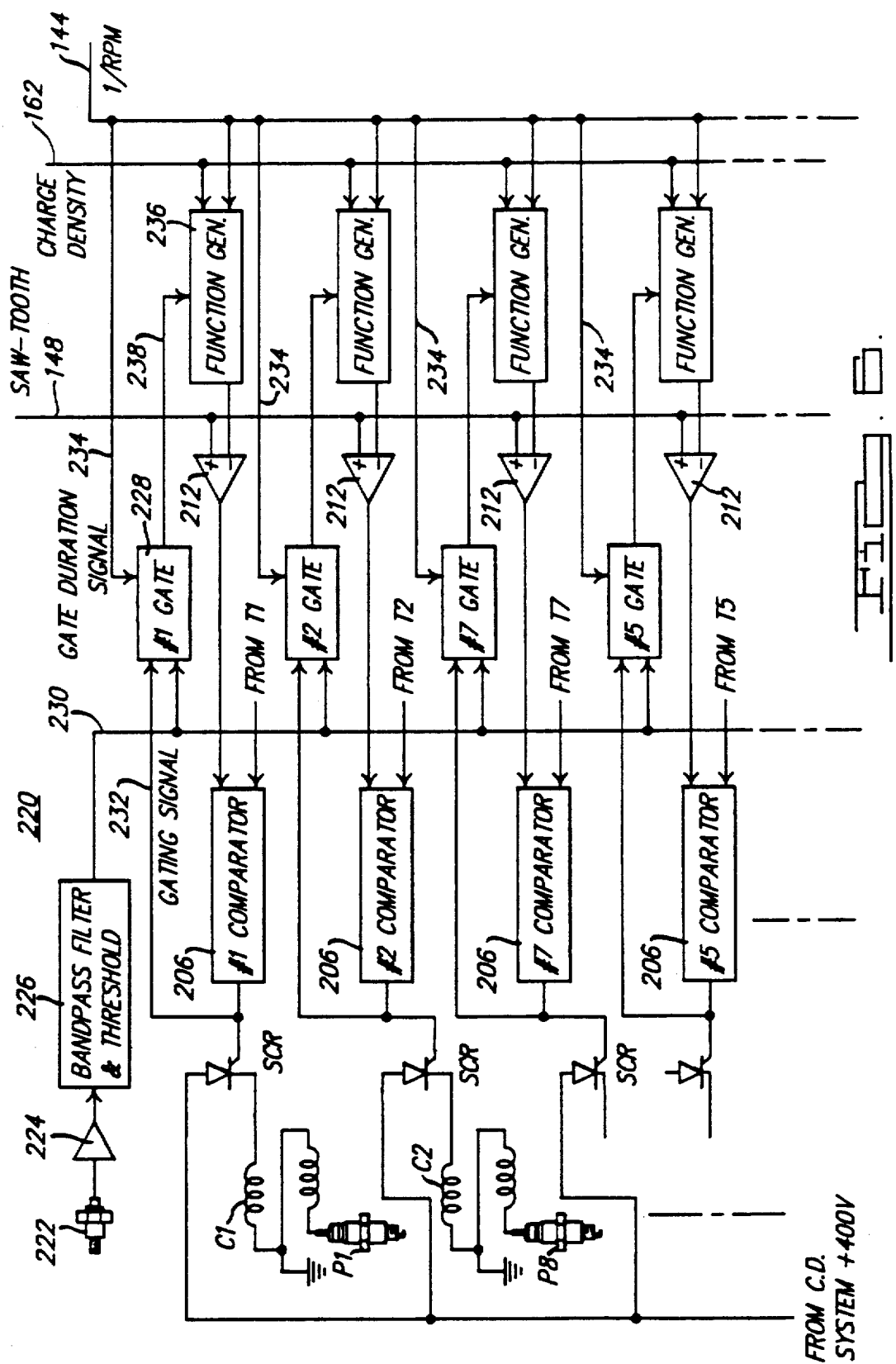

INTERNAL COMBUSTION ENGINE IGNITION SYSTEM AND CLEANING DEVICE

This is a continuation of U.S. patent application Ser. No. 310,837, filed Feb. 14, 1989, still pending which is a continuation of Ser. No. 187,933, filed Apr. 29, 1988, U.S. Pat. No. 4,809,662, which is a continuation of Ser. No. 137,195, filed Dec. 23, 1987, abandoned, which is a division of Ser. No. 873,075, filed June 2, 1986, U.S. Pat. No. 4,718,381, which is a continuation of Ser. No. 651,042, filed Sept. 14, 1984, abandoned, which is a continuation of Ser. No. 374,803, filed May 14, 1982, U.S. Pat. No. 4,471,737, which is a continuation of Ser. No. 161,282, filed June 10, 1980, abandoned, which is a division of Ser. No. 934,322, filed Aug. 16, 1978, U.S. Pat. No. 4,257,373, which is a division of Ser. No. 800,959, filed May 26, 1977, U.S. Pat. No. 4,116,173, which is a continuation of Ser. No. 572,167, filed Apr. 28, 1975, abandoned, which is a division of Ser. No. 336,559, filed Feb. 28, 1973, U.S. Pat. No. 3,903,856.

BACKGROUND AND SUMMARY OF THE INVENTION

In recent years, scientists and the public generally have become more accutely aware of the injurious effects of air pollution, and additionally, the contribution of the exhaust emissions of internal combustion engines to air pollution. Consequently, legislation of increasing restrictiveness has been passed to limit the exhaust emissions from automobiles. Although the automobile engine manufacturers have attained a certain degree of success in meeting these exhaust emission restrictions, it has been found in tests that an automobile which has met the requirements at the time of manufacture, often may not meet the requirements after only a relatively short period of use. The expectancy that an automobile engine will meet the restrictive requirements diminishes with random, and often non-existent, maintenance efforts by the owner. Clearly, laxity of owner maintenance is in large part the result of the inconvenience connected with servicing of an automobile, prolonged waiting, and often, the deprivation of the use of the automobile. Without mandatory legislation regarding automobile maintenance, it is not expected that the maintenance efforts of automobile owners will significantly improve in the future. Consequently, the problem of maintaining an automobile engine in a low emissions condition after manufacture of the engine is a particularly perplexing one.

It is known that hydrocarbon emissions from the exhaust of automobile engines are in part the result of the existance of crevices in the combustion chamber where gasoline, liquid and vapor may find refuge from the burning process so that they are released to the atmosphere during the exhaust stroke as unburned hydrocarbons. Internal combustion engines which are not properly maintained develop deposits in the combustion chamber which greatly increase the number and size of crevices. To a lesser extent, a properly maintained engine will also develop deposits in the combustion chamber which results in increased unburned hydrocarbons.

The present invention provides a system for cleaning the combustion chambers to reduce the combustion chamber deposits in a manner which causes minimal, if any, inconvenience to the owner of the automobile, and which improves the operation of the engine so that the owner will be inclined to use the system. The system may be vehicle-mounted, and if desired, can be made automatic in operation so that no attention from the owner or user is required. Alternatively, an engine cleaning system according to the present invention can be adapted for use as a service station appliance, for example, by providing cooperating electrical fittings on the appliance and the automobile.

In one form of this invention, the ignition timing of selected cylinders of a multi-cylinder automobile engine is electrically advanced beyond the ordinary operating advances, and preferably, to such a degree to change the selected cylinders from power producers to power absorbers. The severe advance of those cylinders results in especially high combustion chamber surface temperatures and high detonation pressures which serve to burn and dislodge the combustion chamber deposits so that they are removed from the combustion chamber on the exhaust stroke. Since some of the cylinders operate as power absorbers, the throttle can be opened significantly above idle position so as to contribute to the high temperature and detonation pressures in the pre-ignited cylinders. By virtue of this feature, cleaning with advanced throttle opening can be accomplished with the transmission of the vehicle in neutral or disengaged from the engine without the use of a dynamometer or other power-absorbing device so that this system is especially adaptable to installation in the vehicle. Also, the period of operation is short so that the high temperatures are limited to the combustion chamber surfaces whereby the underlying material is not damaged by overheating. The selected cylinders which are advanced are changed at random or in sequence, automatically or manually, until all of the cylinders of the engine have been cleaned.

In one exemplary embodiment of a cleaning device of the present invention, a pulse derived from the automobile distributor contacts is received by a variable delay circuit which, in effect, provides an output pulse which may be variably advanced with respect to the ignition of the next cylinder. With four-cylinder systems conventional distributors and coils may be used since almost 90° of supplementary advance is available which is adequate to cause the high surface temperatures and detonation pressures required for short period cleaning. In the case of engines having more than four cylinders, such as eight cylinder engines, the conventional distributor cap and coil is preferably substituted by an electronic distributor to provide the preferred degree of ignition advance.

Each of the systems disclosed herein may be readily modified to accommodate differing advances for the various cylinders to accommodate variations in fuel/air mixtures received by the cylinders. For example, the various cylinders may be adjusted in unison according to a single fuel air mixture signal, or the advance of the individual cylinders may be adjusted independently in accordance with plural fuel air mixture signals for respective ones or groups of the cylinders.

In yet another exemplary system, the occurrence of detonation or "pinging" is sensed and the advance of the particular cylinders experiencing detonation is retarded a fixed increment for each occurrence of detonation. When detonation is no longer detected at that cylinder, the timing of that cylinder is allowed to advance at a relatively slow rate until the next occurrence of detonation.

In another exemplary system, the time of flame propagation from the spark plug to a preestablished location in the cylinder combustion chamber is measured and the advance of the particular cylinder is set in accordance with the speed of propagation of the combustion flame relative to the engine cycle. It will be appreciated that each of the two latter systems are fully adapted to the conditions which affect engine operation, for example, the octane of the fuel being used, engine temperature and engine load.

BRIEF DESCRIPTION OF THE DRAWINGS

FIG. 1 is a schematic diagram of a first exemplary embodiment of an ignition system according to this invention which is especially suitable for use with engines having four or less cylinders;

FIG. 5 is a fourth exemplary embodiment of an ignition system according to the present invention which is along the lines of the embodiment of FIGS. 3A and 3B but provides independent rates of advance for each of the cylinders of the engine.

FIG. 6 is a fifth exemplary embodiment of an ignition system according to the present invention which adjusts the ignition timing of each of the cylinders in accordance with detected detonations at each of the cylinders.

DETAILED DESCRIPTION OF THE PREFERRED EMBODIMENTS

Figure 2A:
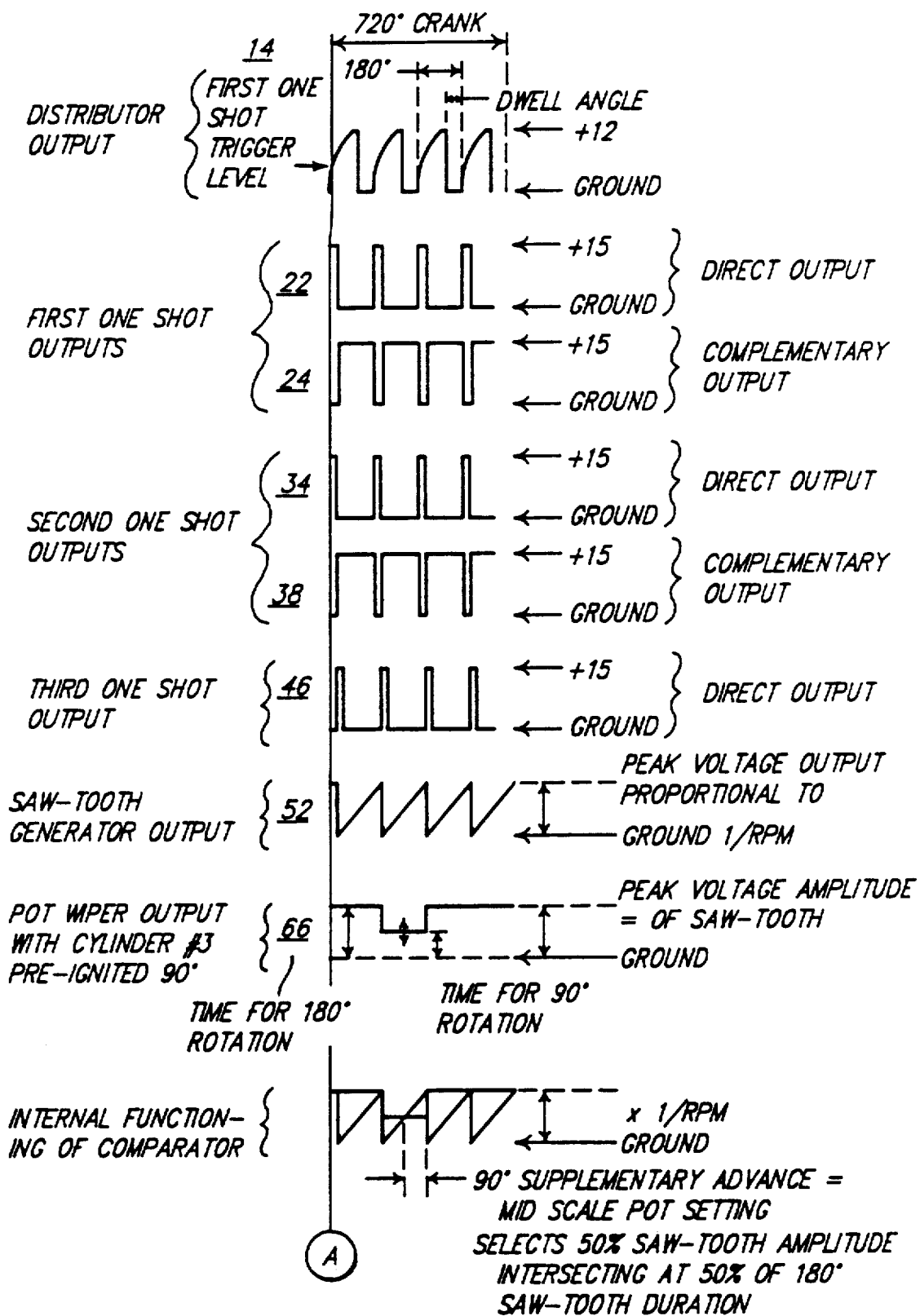
FIGS. 2A and 2B are a series of charts illustrating the various signal sequences of the system of FIG. 1.
Figure 2B:
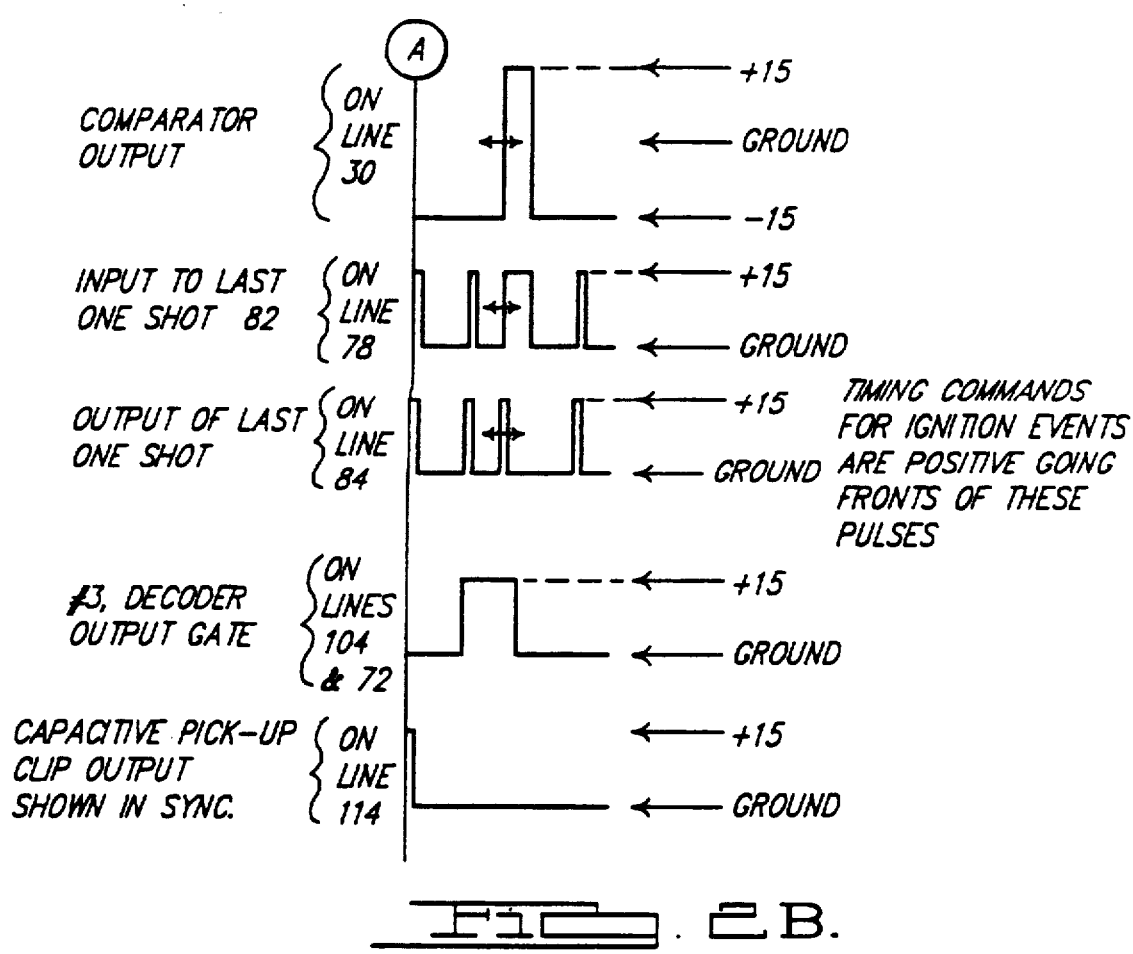

In FIG. 1, a system 10 is illustrated which is especially suitable for use with four cylinder internal combustion engines and which uses the conventional mechanical distributor and coil 12 of the engine. In the discussion of the system 10, reference should be made to FIGS. 2A and 2B in which the relationship of the various signals are graphically illustrated. The system 10 receives the pulse 14 created upon opening of the automobile distributor contacts 16 which disconnects the contact terminal 18 from ground so that the potential at the terminal 18 increases rapidly toward battery potential. The pulse 14 is received by a first one-shot multivibrator 20 which is triggered when the potential of pulse 14 reaches the trigger level of the first one-shot multivibrator 20. The first one-shot multivibrator provides a positive going pulse 22 on line 26 and a negative going pulse 24 on line 28. The pulse 22 on line 26 is received by a tachometer 30 which time-averages the pulses to indicate engine speed and by a second one-shot multivibrator 32 which provides a positive going pulse 34 on line 36 and a negative going pulse 38 on line 40. The negative going pulse 38 on line 40 is received by a third one-shot multivibrator 42 from line 44 which provides a single positive going pulse 46 on line 48. With particular reference to FIG. 24, it will be noted that the pulse 46 is offset or delayed with respect to the other pulses 22, 24, 34, and 38 by the width of the pulse 38 since the third one-shot multivibrator 42 responds to the positive going portion of the pulse 38. The pulse 46 is received by a switch 50 which keys a sawtooth generator 54 so as to initiate a voltage ramp 52 from the sawtooth generator 54 which is delivered on a line 56 to the input of a sample and hold circuit 58. The negative going pulse 38 on line 40 is delivered to the gating terminal of the sample and hold circuit 58 whereby the sample and hold circuit will provide an output on output terminal 60 which is representative of the ramp voltage at the time that the sample and hold circuit 58 is gated. Recalling now that the pulse 38 slightly precedes the pulse 46 which initiates the sawtooth generator ramp 52, it can be seen that the output of the sample and hold circuit 58 will be near the maximum voltage of the sawtooth ramp 52. Consequently, the output on line 60 will be substantially representative of the maximum potential of the sawtooth. The output on line 60 is received by a variable potentiometer 62 which is connected to ground through a switch 64. The potentiometer 62 has a wiper 66 which provides an output signal 68 on line 70 which is some fraction or portion of the output signal at output terminal 60, determined in accordance with the position of the wiper 66, during intervals while the switch 64 is closed. As will be appreciated hereinafter, the position of the wiper 66 of the potentiometer 62, and therefore, the potential at wiper 66, determines the degree of supplementary advance of the cylinders selected for preignition. At times when the switch 64 is open, the signal 68 on line 70 approaches the full potential signal at output terminal 60. The switch 64 is operated by a gating signal on line 72 which gating signal is present for 180 crank angle degrees preceding the normal firing time of each of the cylinders to be advanced. A signal 68 on line 70 having minimum potential level, as shown in FIG. 1, representative of the degree of supplementary advance and the sawtooth signal 52 on a line 74 which extends from line 56 are received at the input of a comparator 76. As illustrated in FIG. 2B the comparator 76 provides an output signal on line 78 with the positive going leading edge thereof indicating when the potential of the sawtooth wave equals the minimum potential of the degree of advance signal 68. The output signal on line 78 is delivered through a diode 80 to a last one-shot multivibrator 82 so as to provide an output pulse on line 84 which is amplified by a buffer amplifier 86 and is used to trigger a capacitive-discharge ignition system 88 which supplies an appropriate current pulse to the coil 12 to fire the spark plug of the advanced cylinder. For the cylinders which are not advanced, the pulses 34 on line 36 are delivered through a diode 90 to the last one-shot multivibrator 82 to operate the capacitive-discharge ignition system 88 to fire the spark plugs of the cylinders with substantially normal advance.

The cylinders to be supplementarily advanced are selected by operation of one or more of a plurality of switches 92 of a selector system 94, with one switch being associated with each cylinder. The switches 92 for the cylinders 1–4 may be either manually set or may be automatically set by an automatic control 93.

For example, automatic initiation of the cleaning operation by the control 93 can be conditioned upon the elapse of a preselected period of time, the operation of a vehicle in which the engine is mounted for a predetermined distance as can be determined from an odometer, or the preselected number of engine revolutions. The automatic control 93 should be programmed so that cleaning occurs only when full power from the engine is not required. For example, in an automobile installation, selected cylinders may be advanced while the engine is providing cruising power or less, and means may be provided to turn the system off to return the advance to normal when a demand for additional power is made such as during passing or an emergency maneuver so that the system does not limit the power available from the engine under those conditions. The demand for additional power may be sensed in accordance with accelerator position or manifold pressure. As an alternative to fully automatic operation, an automatic indicator system may be utilized and the driver may be relied upon to switch on the cleaning system at a convenient time. In this regard, the usual method of indication may be used such as indicator lights, buzzers, etc. Although the switches 92 are not shown to be mechanically operated by the automatic control 93 they may be readily operated by transistors, SCR's, electromagnetic relays, etc. The selector system 94 provides gating pulses on line 72 which are timed so as to be present for intervals preceding the normal firing times of the cylinders to be advanced. The selecting circuit 94 uses a first flip-flop 96 which receives the pulses 24 on line 28, and a second flip-flop which receives the "one" output of the first flip-flop 96 so as to provide a count of the pulses 24 in a binary code form in a known manner. Decoder diode matrix 100 receives the outputs of the first and second flip-flops 96 and 98 and converts the binary code in a known manner to provide sequentially occurring, substantially contiguous pulses on detector output lines 102, 104, 106 and 108 representing the 2nd, 3rd, 4th and 1st cylinders, respectively in the engine firing order. Closing of switch 92 corresponding to a selected cylinder transmits the pulses from the respective one of the output lines 102-108 to the switch 64 so as to gate the switch 64 and select the cylinder having the closed switch for supplementary advance. If the identity of the advanced cylinders is desired the switch sequence 2, 3, 4, 1 may be correctly superimposed on the engine firing order sequence by an identifying apparatus 110 which includes a capacitive pickup clip 112 which, with switch #1 open is clipped to #1 cylinder high voltage spark plug wire so as to identify the rotative position of the engine with respect to the firing periods of the cylinders. In the illustrated example, the pickup clip provides a signal on a pickup output line 114 at the normal ignition time of #1 cylinder. The signal on line 114 is delivered to a coincidence detector and bulb driver 116 which also receives a signal from line 102 on line 118 which commences at the normal firing time of cylinder #1 which is provided by the detector and diode matrix 100. Upon coincidence of the signals on line 114 and line 118, the coincidence detector and bulb driver 116 provide an appropriate potential to light a lamp 120. Consequently, while synchronization is established between the selected crankshaft rotational position and the generation of a pulse corresponding to the selected rotational position of the crankshaft, the synchronizing lamp 120 will be lit. Synchronism is initially established by closing a switch 122 which resets flip-flops 96 and 98 to provide an output pulse for switch #2 when the proper rotative position of the crankshaft for firing is detected by the capacitive pickup clip 112. Switch #2 then controls the pulse initiated by the normal firing time of cylinder #1 so as to insure either the presence or absence of supplementary advance to the second cylinder in the firing order. Thereafter, synchronism is maintained although the switch 122 is disconnected through counting of the occurrences of distributor contact opening.

In summary of the operation of the system 10, the opening of the points 16 provides a pulse 14 which is used to control the firing of the advanced as well as the non-advanced cylinders. Considering a cylinder which is not supplementarily advanced as indicated by an open switch 92 for that cylinder the pulse 14 is effective through intermediate one-shot multivibrators 20 and 32 to initiate an output pulse from the last one-shot multivibrator 82 which is received by the capacitive discharge system 88. The capacitive discharge system 88 in turn fires the appropriate spark plug by generating a current pulse in the primary of the coil 12 at a time appropriate to the respective cylinder. Considering now a cylinder which is supplementarily advanced, it will be seen that the pulse 14 correlative to the preceding cylinder yields a pulse on line 78 which is variably delayed in accordance with the adjustment of the potentiometer 62 so that the pulse 34 on line 36 correlative to the cylinder under a non-advanced condition which would ordinarily be effective to operate the capacitive discharge ignition system 88 to fire the cylinder is preceded and preempted by a pulse on line 78 from the comparator 76 to preignite the cylinder. More particularly, a sawtooth wave is generated at generator 59 which is compared to a signal 68 representing a fraction of the sawtooth peak which fraction is established in accordance with the desired supplementary advance. When the sawtooth wave exceeds the minimum potential of the supplementary advance signal 68, an output signal on line 78 is provided which is effective to operate the capacitor discharge ignition system 88. It will be appreciated that increasingly positive signals 68 result in longer delays from the preceding pulse, and therefore, shorter supplementary advances.

To accomplish cleaning of the advanced cylinders, the ignition supplementary advance is severe enough, preferably almost 90 degrees of crank shaft angle, to result in an especially high combustion chamber surface temperatures and high detonation pressures to burn and dislodge the combustion chamber deposits. Preferably, in a four cylinder engine, two of the cylinders are operated in that manner whereby they serve as power absorbers and so that the throttle can be opened significantly above idle position to contribute to the cleaning effect. When the system is being used to advance selected cylinders to accommodate differences in fuel to air mixtures, the total ignition advance is much less severe and is normally in the range of from 10 to 40 degrees before top dead center.

Figure 3A:
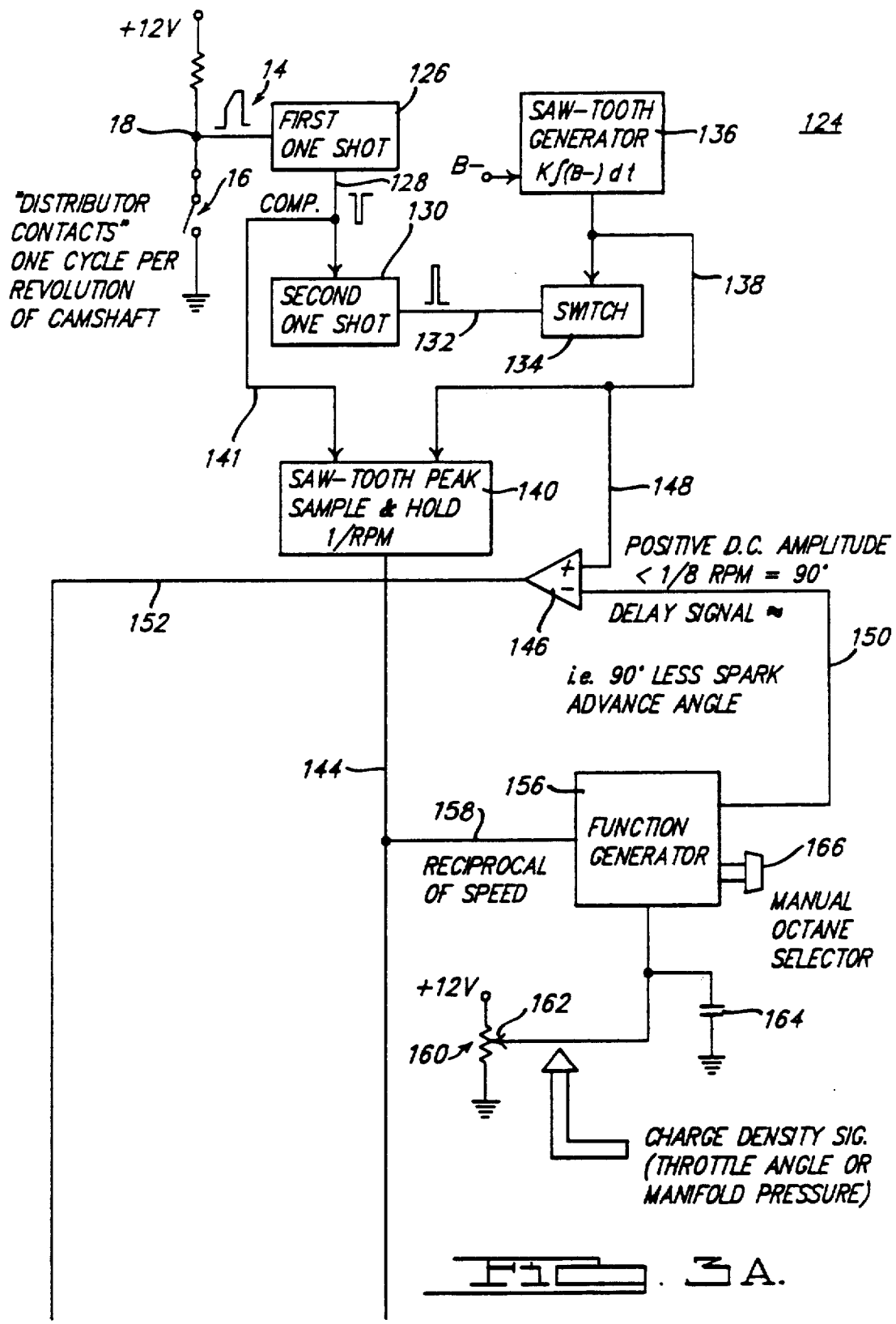
FIGS. 3A and 3B show a second exemplary embodiment of an ignition system according to the present invention which is especially suitable for mounting in a vehicle having more than four cylinders.
Figure 3B:
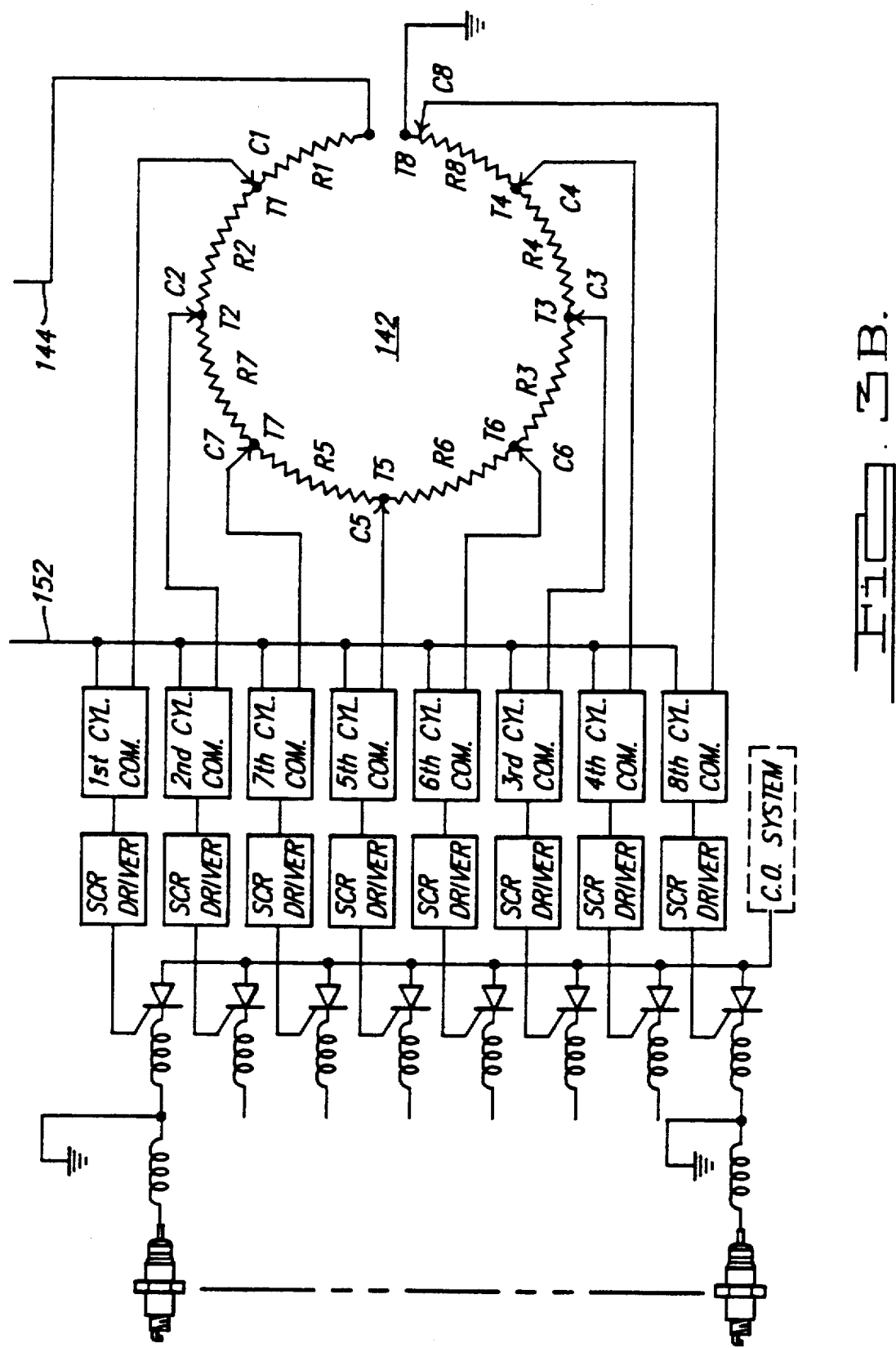

In FIGS. 3A and 3B, an ignition system 124 is illustrated which is adapted to provide an electronically controlled ignition advance for ordinary operation of the vehicle. Additionally, the system 124 of FIG. 3 is readily adaptable for providing supplementary advance for selected cylinders for cleaning generally as set forth above. The system 124 senses a pulse 14 upon an opening of the contacts 16, and, for this embodiment, there is one such opening event for each cam shaft revolution. The pulse 14 is received by a first one-shot multivibrator 126 which provides a negative going pulse on line 128 when the gating threshold of the first one-shot multivibrator 126 is reached. The negative going pulse on line 128 is received by a second one-shot multivibrator 130 which provides a positive going output pulse on line 132 in response to the positive going portion of the pulse on line 128 so that the pulse on line 132 is delayed for time equal to the width of the pulse on line 128. The pulse on line 132 is received by switch 134 which is effective to reset to zero volts the output of a sawtooth generator 136 upon closing of the switch 134. Consequently, a sawtooth waveform is provided on output line 138 of sawtooth generator 136 which repeats on each occurrence of an output pulse from the one-shot multivibrator 130 on line 132. A sawtooth peak sample and hold circuit 140 receives the sawtooth waveform on line 138 and a negative going pulse on line 128 from line 141 so as to provide an output on line 144 substantially representative of the peak potential of the sawtooth waveform on line 138, as described with respect to FIGS. 1 and 2A-2B. The signal on line 144 is received by a circular voltage divider network 142 comprising variable resistors R1, R8, R4, R3, R6, R5, R7 and R2 having preselected resistive values which establish the advance of cylinders 1, 8, 4, 3, 6, 5, 7 and 2, respectively, so that differences in optimum spark advance which are treated as being invariant with engine operating parameters can be accommodated. One or more of the resistors may have resistive values differing from the one or more of the others. Alternatively, or in combination, resistor wiper contacts C1, C8, C4, C3, C6, C5, C7 and C2 may be positionally adjustable so as to vary the resistive values of the respective resistors R1-R8. When the wiper contacts C1-C8 are in the positions shown, the ignition timing is established for normal operation of the engine with constant differences in optimum spark advance being accommodated by the diverse values. However, one or more selected cylinders may be supplementarily advanced to clean the selected cylinders by switching the respective wiper contact C1-C8 counterclockwise on the voltage divider network 142 to change the voltage seen by the respective wiper contact C1-C8, to produce earlier intersection with the modified sawtooth train on line 152 as will be better appreciated hereinafter. It will be noted that during operation with wipers as illustrated, the potential at wiper contact C1 is always greater than at wiper contact C8, the potential at wiper C8 is always less than that at any other wiper contact. The potential at each of the contacts C1-C8 is delivered to one terminal of a voltage comparator for the respective cylinder, and particularly, the potential at C1 is delivered to one terminal of a first cylinder comparator, the potential at contact C8 is delivered to an eighth cylinder comparator, etc.

The sawtooth signals on line 138 are received at one terminal of a differential operational amplifier 146 via a line 148. The other terminal of the differential operational amplifier 146 receives a signal on line 150 which is representative of one or more engine operating parameters according to which ignition advance is to be varied, such as engine speed, engine demand as indicated by throttle angle or manifold pressure, and/or fuel octane. Accordingly, the differential operational amplifier 146 provides a modified sawtooth output signal on line 152 which is representative of the difference between the sawtooth generator output waveform on line 138 and the signal on line 150 representative of the engine operating parameters. The signal on line 152 is received by the other input terminals of each of the first through eighth cylinder comparators whereby the sawtooth waveform, as modified by engine operating parameters, will be compared with the potentials at the respective wiper contacts C1-C8.

It should be noted, that, in the embodiment illustrated, the magnitude of the voltage on line 150 may be no larger than approximately one eighth of the magnitude of the voltage on line 144. Otherwise, the maximum amplitude of the modified sawtooth output of amplifier 146 may be below the fraction of the unmodified sawtooth peak picked off the voltage divider by wiper C1 thus preventing an intersection in the comparator for cylinder #1. Thus it will be recognized that increasing the voltage on line 150 has substantially the same effect on the comparator output as moving contacts C1-C8 clockwise on the voltage divider. Each of the cylinder comparators provides an output signal to an associated one-shot multivibrator and buffer amplifier when the signal of the modified sawtooth waveform on line 152 reaches the voltage at the associated wiper contact. Since the potential at wiper contact C8 is closest to zero, i.e. ground potential, the number eight cylinder comparator provides an output signal near the inception or zero point of the sawtooth waveform. In sequence, the cylinder comparators for cylinders 8, 4, 3, 6, 5, 7, 2 and 1, respectively, provide output signals when the modified sawtooth waveform equals or exceeds the voltage at its respective wiper contact. The entire voltage divider network 142 represents 720° of crankshaft revolution. The one-shot buffers for cylinders 1-8 are effective to drive silicon controlled rectifiers Q1-Q8, respectively, into conduction so as to connect the capacitive discharge system 154 through respective ones of ignition coils T1-T8 which are connected to fire spark plugs P1-P8, respectively. Separate coils are utilized for each spark plug so as to dispense with a conventional mechanical distributor for eight cylinder engines which would limit the system to a supplementary ignition advance of only 45°. More particularly, it will be appreciated that with mechanical distributors, advances of more than 45° will position the rotor arm closer to the contact of the preceding cylinder to be fired than the contact of the intended cylinder so as to cause flash-over to the preceding contact. It is desirable for efficient cleaning of the engine to establish ignition advances of more than 45°. It will also be appreciated that conventional mechanical distributors may be used with four cylinder engines as illustrated in FIG. 1 since the fewer number of cylinders permit advances of approximately 90° without flash-over.

The signal on line 150 representative of engine operating parameters is derived from a function generator 156 which receives a signal representative of the peak potential of the sawtooth waveform from line 144 on a line 158. Since the peak potential is representative of the time elapse between pulses 14, it is inversely representative of, i.e. the reciprocal of, engine speed. The function generator also receives a signal from a variable potentiometer 160 which is representative of throttle opening or manifold pressure. The potentiometer 160 may include a wiper contact 162 which is connected to the throttle arm of the carburetor so as to provide a fractional amount of a regulated voltage which is varied in accordance with throttle position. A filter capacitor 164 is connected between the wiper contact and ground so that the generator may be delayed in its response to rapid and brief changes in throttle position. The function generator also includes a manual input 166 which suitably adjusts the ignition advance in accordance with the octane of the fuel being used by the automobile. The contribution of each of engine speed, throttle position, and octane to the signal on line 150 may be selected in accordance with known relationships so as to provide an appropriate engine operating parameter signal on line 150.

It will be appreciated that the sawtooth peak signal on line 144 could have been modulated in accordance with engine operating parameters rather than the sawtooth waveform. It will also be appreciated that the adjustment of the wiper contacts C1-C8 can be made manually by the operator, or may be accomplished by a mechanical or electronic control as described with respect to FIG. 1.

In summary of the operation of the ignition system 124, the occurrence of a pulse 14 representing the opening of contacts 16 initiates a sawtooth waveform on line 138 after a preset very small time delay. The sawtooth waveform on line 138 is modified in accordance with selected engine operational conditions at operational amplifier 146. A signal representative of the peak of the sawtooth waveform, provided by the sample and hold circuit 140, is reduced in potential level in stages in accordance with the desired advance for each cylinder and the time sequence of firing of each cylinder by the voltage divider 142. The modified waveform from the operational amplifier 146 is compared at each cylinder with the potential derived from the voltage divider network 142 so as to yield a spark initiating signal when the modified waveform from the operational amplifier exceeds the potential from the voltage divider 142 whereby each spark plug P1-P8 is fired in turn and with a preselected advance to accommodate differing engine operating parameters such as fuel/air mixtures and/or to accomplish combustion chamber cleaning.

Figure 4:
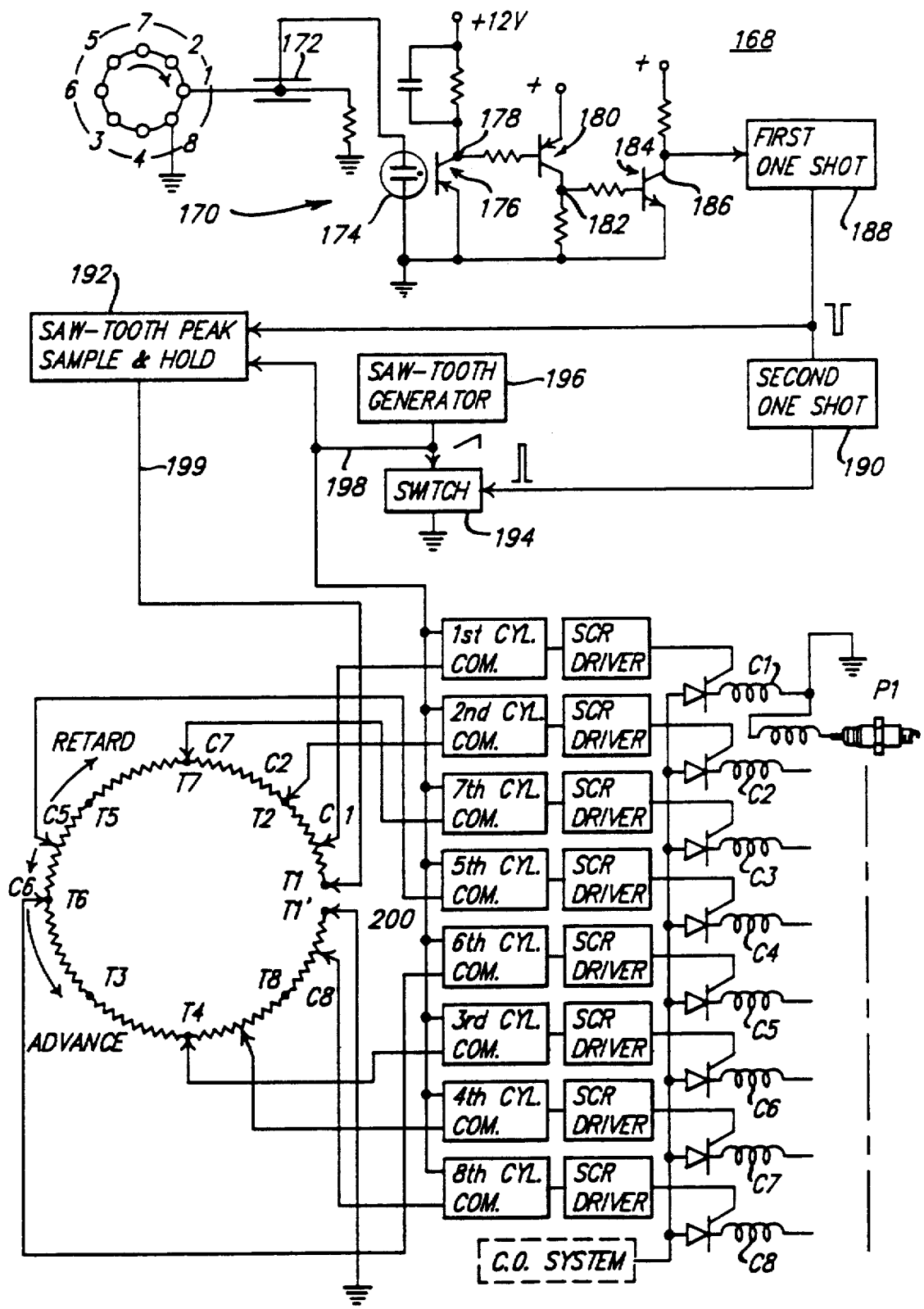
FIG. 4 is a third exemplary embodiment of an ignition system according to the present invention which is especially suitable for use in a service station or the like for periodic servicing of vehicles not having vehicle-mounted cleaning systems.

In FIG. 4, an ignition appliance 168 is shown which is suitable for use in service stations and the like for cleaning internal combustion engines of automobiles brought in for servicing. The appliance 168 includes means 170 sensitive to the rotational position of the distributor shaft which, for example, may include a pickup 172 which is capacitatively coupled to an ignition wire such as a #1 spark plug wire as shown to detect the transmission of a potential pulse through the wire. The pulse which is coupled to the capacitive pickup 172 is received by a cold cathode tube 174 to fire the tube thereby emitting light. A photo-transistor 176 is optically coupled to the tube so that the transistor 176 is turned on when the tube 174 is fired. When the transistor 176 is off, its collector 178 is near battery potential while the firing of the transistor 176 pulls the collector potential to near ground potential so as to create a negative going pulse. The thusly created negative going pulse is delivered to an amplifying transistor 180 which is turned on when the negative going pulse is received so as to provide a positive going pulse at its collector 182 which is delivered to a third amplifying transistor 184 to turn on transistor 184 to provide a negative going pulse at its collector 186. The negative going pulse at the collector of the transistor 184 is delivered to a first one-shot multivibrator 188 which provides a negative going pulse of predetermined width to a second one-shot multivibrator 190 and to the gating terminal of a sawtooth sample and hold circuit 192. The sawtooth sample and hold circuit 192 is gated on the positive going portion of the pulse from the first one-shot multivibrator 188. The second one-shot multivibrator 190 is responsive to the positive going portion of the pulse from the first one-shot multivibrator 188 to provide a positive going pulse which is delivered to an electronic switch 194 which is operatively connected to a sawtooth generator 196 to reset the sawtooth generator 196 on each occurrence of the pulse from the one-shot multivibrator 190. The sawtooth generator 196 provides a sawtooth waveform on line 198 which is delivered to the sample terminal of the sawtooth peak sample and hold circuit 192. The sawtooth peak sample and hold circuit is gated by the negative going portion of the pulse from the first one-shot multivibrator 188 so that the sawtooth peak sample and hold circuit holds the value of the sawtooth wave slightly prior to resetting of the sawtooth generator, and particularly, at a time interval prior to resetting of the sawtooth generator 196 equal to the width of the pulse from the first one-shot multivibrator 188. Accordingly, the signal held by the sawtooth peak sample and hold circuit 192 is substantially representative of the peak of the sawtooth waveform generated by the sawtooth generator 196. The sawtooth peak signal of the sawtooth peak sample and hold circuit 192 is received by a circular voltage divider network 200 having terminals T1-T8 for cylinders 1 through 8, respectively, which are adapted to be engaged by wiper contact C1-C8, respectively, so as to provide normal ignition timing. Accordingly, the values of the resistances intermediate the terminals T1-T8 are of equal value. The wiper contacts C1-C8 are adapted to be positionable intermediate the terminals T1-T8 toward the next preceding terminal cylinder in the firing order (counterclockwise) so as to supplement the advance of the selected cylinders. With regard to FIG. 4, it can be seen that the wiper contact C4 for cylinder four is advanced approximately midway between the terminals T4 and T8 so as to provide approximately 45° supplemental ignition advance while the wiper contact C3 for cylinder three is advanced to contact T4 to provide 90° supplemental advance. Terminals T1 and T1' are separated in voltage by the prevailing sawtooth amplitude and may be considered to be separated in time by the very small duration of the negative going pulse from the first one-shot multivibrator 188. Thus contact C8, for example, may be moved counter-clockwise beyond T1 in the event it is desired to supplement the advance of cylinder #8 more than 90 crankshaft degrees. The potentials at wiper contacts C1-C8 are compared with the sawtooth waveform from the sawtooth generator 196 at the first through eighth cylinder comparators to yield output signals therefrom when the signals are equal. The output signals from the first through eighth cylinder comparators are delivered to one-shot buffers which provide a pulse to fire silicon controlled rectifiers Q1-Q8, respectively, which in turn deliver a primary ignition pulse from a capacitive discharge system 202 to ignition coils. T1-T8 for spark plugs P1-P8, as previously described with respect to the system of FIGS. 3A and 3B.

It will be appreciated that the appliance 168 of FIG. 4 is readily adapted for service station use since it is readily connectable to an automobile engine. More particularly, the appliance 168 can be operatively connected to an automobile engine by removal of all of the plug leads, clamping the capacitive pickup clip 172 to the appropriate distributor lead, and plugging leads from the ignition coils T1-T8 to the respective spark plugs P1-P8. Selected ones of the cylinders 1 through 8 may be advanced by adjustment of the wiper contacts C1-C8 as previously described. If desired, cooperating electrical fittings may be installed on the appliance and on the automobile so that the above described connections and disconnections may be made in a single operation.

In FIG. 5, another exemplary embodiment of an ignition system 202 according to the present invention is illustrated. The ignition system 202 of FIG. 5 is like the ignition system 124 of FIGS. 3A and 3B in that it includes means for providing a sawtooth waveform on line 148 which repeats on each mechanical cycle of the automobile engine, i.e., each 720° of rotation of the crankshaft of a four cycle piston engine. The system 202 also includes means for providing a signal on line 144 representive of the inverse of engine speed. The sawtooth is phased such that the ramp of the sawtooth waveform is initiated previously to the most advanced ignition timing contemplated for the cylinder 8, and may be established in accordance with the opening of conventional distributor contacts for the engine. For example, the initiation of the ramp may occur on compression stroke top dead center for cylinder #1. Terminals T1-T8 corresponding to cylinders 1-8 are spaced about a voltage dividing resistor 204 in the quarter appropriate for firing, for example, T8, T4, T3, T6, T5, T7, T2, T1, respectively, as illustrated. The terminals T1-T8 may be equally spaced about the voltage dividing resistor 204, or alternatively, certain of the terminals T1-T8 may be forwardly or rearwardly in position to advance or retard the firing of the selected cylinders. It will be appreciated that this advance or retardation by virtue of the adjustment of the position of the selected terminals will introduce a bias in the spark advance of the particular cylinders. By way of illustration, the bias of the selected cylinders may be established so that four cylinders of an eight cylinder engine may run on propane and four cylinders of the engine may run on gasoline. The terminals T1-T8 may be manually or automatically adjustable to introduce the desired bias. Consequently, ignition timing may be varied independently or collectively for the cylinders of the engine. In the particular example shown, adjustment of the terminals T1-T8 in the clockwise direction increases the voltage level at that terminal to retard the spark, and vice-versa. In this regard, a clockwise movement from the terminal T8 is in the direction of increasing voltage, while a clockwise movement from each of the other terminals is in the direction of decreasing voltage. Nonetheless, the effect of the clockwise movement is the same in each case, i.e. to advance the spark since the movement from the terminal T8 past the terminal connecting with line 144 represents only a small movement in crank angle although the potential difference may be quite large. More specifically, the rotation of crank angle representative of the movement of the terminal T8 to the terminal connecting with line 144 represents the crank angle rotation during the width of the pulse from the first one-shot multivibrator 126.

As described with respect to FIG. 3B, the terminals T1-T8 are connected to first through eight cylinder comparators 206 as illustrated in FIG. 5. The signal on line 144 representative of the inverse of the engine speed is also connected to first through eighth cylinder function generators indicated at 208. The first through eighth cylinder function generators 208 also receive a signal representative of engine octane from an octane selector potentiometer 210 which is manually adjustable by the vehicle operator and is preferably located in the passenger compartment of the vehicle, and a signal representative of charge density from a charge density potentiometer 162 which is preferably operatively connected to the engine throttle for responding to the engine throttle or to a pressure transducer to respond to intake manifold pressure. The contribution of each of engine speed, throttle position, and octane to the output signal from each function generator 208 is established in accordance with known relationships so as to provide an appropriate engine operating parameter signal to an associated summing amplifier indicated at 210 for each cylinder. Each of the function generators 208 establish independent functional relationships based on the parameters of engine speed, octane and charge density in accordance with the variations in the design test performance of the engine in response to those parameters for each cylinder. In this regard, burning time within the combustion chambers of each cylinder is not identical each with respect to the other, but rather, the combustion time may vary due to several factors including the variations in the fuel air ratio between the cylinders. For example, the fuel air ratio of a modern V8 engine may vary as much as two ratios between the richest cylinder and the leanest cylinder under certain conditions of speed and load. The function generators for each of the cylinders produces an output signal which provides an optimum spark advance for each cylinder by adjustment of each of the function generators in accordance with the predictable variations between the cylinders.

The summing amplifiers 210, in addition to receiving the output signal from the function generators 208, also receives the sawtooth waveform from line 148. The summing amplifiers 210 also receive the output signal from the function generators 208 so that the output from the summing amplifier represents a sawtooth waveform which is modified in accordance with the signal from the function generators 208, and particularly, is reduced in accordance with the signal from the function generators 208. The modified sawtooth waveform from the summing amplifiers 210 are compared with the signals from the respective ones of the terminals T1-T8 at associated comparators 206 for the first through eighth cylinders so as to fire an associated SCR when the signals are equal. The firing of the SCR discharges the capacitor of a CD system 214 through individual ignition coils C1-C8 which in turn fire spark plugs P1-P8.

In FIG. 6, yet another exemplary embodiment of an ignition system according to the present invention is shown. The ignition system 220 of FIG. 6 is like the ignition system 202 of FIG. 5 and the ignition system 124 of FIGS. 3A and 3B, and accordingly, signals of like nature from like components are shown to be received on like-numbered conductors. Hence, a signal is received on a line 144 representative of the peak amplitude of the sawtooth waveform which is in turn inversely representative of the engine speed, a signal line 162 is received which is representative of the charge density, a sawtooth waveform signal on line 148 is received which repeats on each mechanical cycle of the engine, i.e. each 720° of rotation of the crankshaft of a four cycle piston engine, and signals are received by comparators 206 for the respective cylinders of the engine from terminals T1-T8 on a voltage dividing resistor 204, all as previously described.

The ignition system 220 of FIG. 6 differs from the previously described ignition system in that the system 220 features closed loop control of the spark advance for each cylinder as a function of detected undesirable detonations. More particularly, the ignition system of FIG. 5 is capable of operating each of the combustion chambers of a multi-cylinder engine as close to a detonation condition as may be desired without suffering significant power loss from detonation. In this regard, under engine operating conditions involving slow speed and high manifold pressure, the spark advance is frequently limited by early undesirable detonations. If detonation did not occur, more torque could be obtained by advancing the spark. Since there are variations in operating conditions between the cylinders and variations in operating conditions from cycle to cycle, all of which affect the spark advance at which detonation may occur for each of the cylinders, the traditional method for avoiding undesirable detonation is to retard the spark to all of the cylinders until detonation is reduced to an acceptable level at all cylinders and under all cycle to cycle variations. In other words, the spark is sufficiently retarded so that the worst cylinder under the worst cyclic conditions is accommodated. Consequently, the cylinders which could tolerate an additional spark advance without undesirable detonation are ignited subsequent to the optimum time, and therefore, do not provide optimum torque. In addition to the problem of accommodating the variations between cylinders and variations between cycles, variations in the octane rating of the fuel used during the life of an engine has been a problem. The system of FIG. 6 provides a solution to the problem of variations between cylinders, variations from cycle to cycle, and variations in fuel automatically and effectively without attention from the operator.

To accomplish the above end, a transducer 222 is provided which is attached to the block of the engine, e.g. by threading into a tapped blind hole in the engine block, and which is responsive to vibrations transmitted through the block which are representative of an undesirable detonation. For example, the transducer 222 can be responsive to the vibrations in the audible range and preferably provides an electrical output signal representative thereof. The output signal of the transducer 222 is amplified by a suitable amplifier 224 and is thereafter received by a bandpass filter and threshold device 226. The bandpass filter and threshold device 226 allows the transmission of only a very narrow band of frequencies detected by the transducer 222 and provides an output signal when the frequencies at this narrow band exceed a predetermined threshold. The narrow band is selected so as to be within the range of frequencies which are distinctively related to undesirable detonations as opposed to frequencies caused by normal mechanical vibrations and normal charge burning. The threshold level of the threshold device is set so that the device will not pass signals caused by spurious low magnitude vibrations due to effects not indicative of an undesirable detonation. The output of the bandpass filter and threshold device 226 is provided to gates 228 for cylinders 1 through 8 via a common conductor 230. The gates 228 receive the output of the bandpass filter and threshold device 226 at one terminal and a gating signal from the respective gates of the firing SCR's on respective lines 232 for each of the cylinders 1-8, and a gate duration signal from the line 144 via individual lines 234. The output of the gates 228 is provided to respective function generators 236 for the cylinders 1-8 by respective lines 238. The gates 228 transfer the signal from the bandpass filter and threshold device 226 representative of an undesirable detonation to the function generator 236 for a period beginning with the provision of a gating signal on the respective line 232 having a duration established by the gate duration signal 234. The gates 228 are used to time-isolate the postignition detonations for each cylinder from the other cylinders so that the appropriate function generator 236 can be controlled to adjust the timing of that cylinder only. In this regard, it is known that, initially at least, an undesirable detonation for each cylinder will occur in the interval between the provision of an ignition signal to the gate of the SCR for that cylinder until a predetermined time thereafter which is inversely proportional to the speed of the engine. That predetermined time is established by the gate duration signal on each line 234 which is inversely related to the speed of the engine as previously explained. If desired, the predetermined period in which an undesirable detonation for a cylinder can occur can alternatively be established by opening the gate for that cylinder in the interval between the provision of an ignition signal to the SCR for that cylinder and the provision of an ignition signal to the SCR of the next cylinder to be fired. In the latter method, the gate would be inhibited by the gating signal to the SCR of the next cylinder to be fired.

The function generators 236 are responsive to the engine speed as obtained from line 144, the charge density as obtained from line 162, and pre-ignition detonation conditions as obtained from line 238. The function generator 236 responds to charge density and engine speed, analogous to manifold vacuum and centrifugal mechanism signals of conventional spark advance systems, respectively, in the manner previously described. The output signal of the function generator 236 provides an initial nominal spark advance setting in accordance with known spark advance information. When an undesirable detonation is detected as indicated by the receipt of a signal on line 238, the function generator provides a signal which is effective to decrease the spark advance a predetermined small increment. Each successive time that a signal on line 238 is received indicating that the respective cylinder is experiencing an undesirable detonation, the function generator output retards the spark a like increment, for example, one degree for each cycle. When the absence of a signal on line 238 indicates that the respective cylinder is not experiencing an undesirable detonation, the spark is automatically advanced a small degree, e.g. 0.01 degree for each cycle, until such time that an undesirable detonation is detected at which time the spark is again retarded the aforementioned increment. In this manner, the spark advance for each cylinder is subject to continuous adjustment in accordance with the burning conditions in that cylinder so that the charge in each of the cylinders is ignited at the optimum time. The function generator 236 controls the spark in the manner described with respect to the system 202 of FIG. 5 via summing amplifiers 212 and comparators 206 which control respective SCR's for the cylinders. As previously described, the SCR's discharge the capacitor of a capacitive discharge ignition system into respective ignition coils C1-C8 for spark plugs P1-P8.

Figure 7:
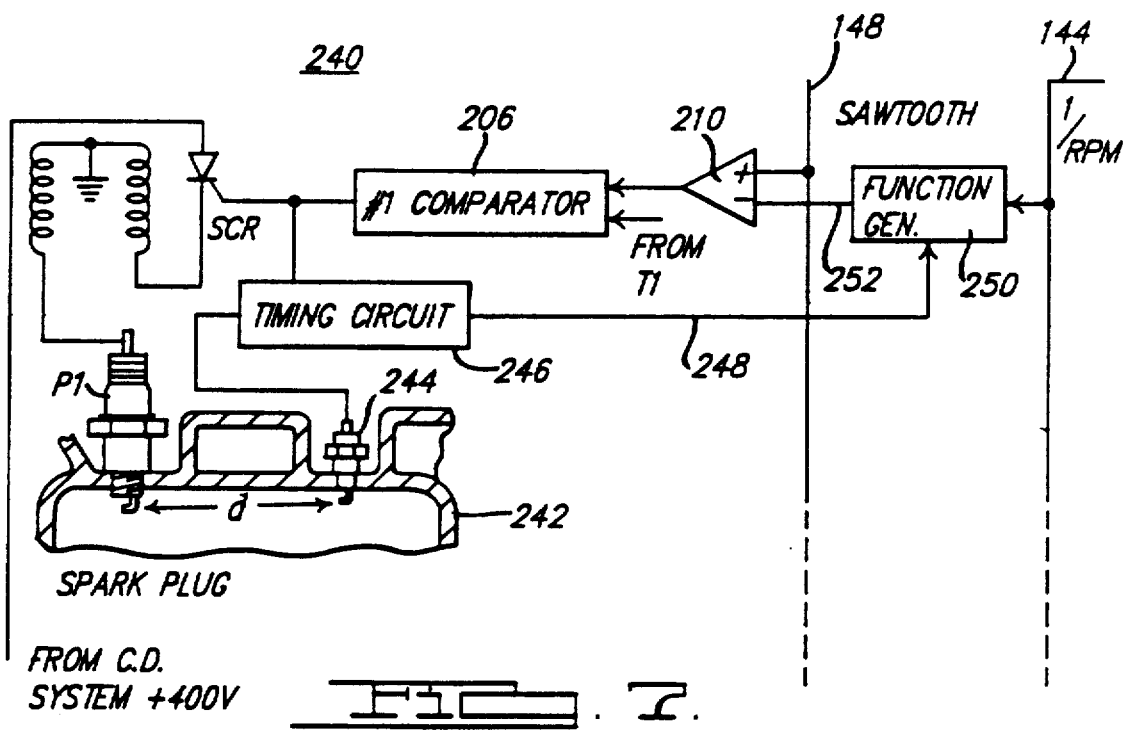
FIG. 7 is a sixth exemplary embodiment of an ignition system according to the present invention which adjusts the ignition timing of each of the cylinders in accordance with the rate of flame propogation in each of the cylinders relative to the engine cycle.

In FIG. 7, still another examplary embodiment of an ignition system according to the present invention is illustrated. The ignition system 240 of FIG. 7 is along the lines of the ignition system 220 of FIG. 6 and also includes a closed loop control of spark advance as a function of the burning conditions in each of the respective cylinders. In the system 240 of FIG. 7, the charge burning time in each of the cylinders is measured by measuring the time that the flame front takes to progress a predetermined distance and the advance for each of the cylinders is established according to the charge burning time for that cylinder. In this sense, the closed-loop system of FIG. 7 is responsive to the analogue representation of charge burning time whereas the ignition system 220 of FIG. 6 is responsive to a binary signal indicating whether or not the cylinder is experiencing an undesirable detonation.

The system 240 receives the previously described signal representative of the inverse of engine speed on line 144 and the sawtooth waveform on line 148. For brevity, only a single cylinder of a multi-cylinder engine is illustrated in FIG. 7, however, it will be appreciated that any number of cylinders can be similarly controlled by duplication of the system shown as taught with respect to the previous embodiments.

In FIG. 7, cylinder head 242 of the engine is provided with an ionization detector 244 which in essence includes a pair of spaced electrodes projecting into the combustion chamber, and means for measuring the electrical resistance therebetween. Upon ignition of the combustible mixture in the cylinder 242 by the spark plug P1, a flame front advances from the electrodes of the spark plug P1 to the electrodes of the ionization detector 244, traversing the distance d. The time of this traverse is measured by a timing circuit 246 which receives a signal from the gate of the SCR when the SCR is fired and which receives a signal from the ionization detector 244 when the resistance between the electrodes of the ionization detector 244 has decreased to indicate that the flame has reached the ionization detector 244. The timing circuit measures this interval in fractions of a second and provides an analogue signal representative thereof on line 248 which is received by a function generator 250. The function generator 250 receives a signal from line 144 representative of the inverse of the engine speed in revolutions per minute and the analogue signal representative of the time of flame propagation and provides a spark advance signal on line 252 to the previously described summing amplifier 210 to establish the ignition advance for the cylinder.

Empirically, it has been found desirable to establish the spark advance so that three-quarters of the burning time of the charge occurs before top dead center of the compression stroke. With a view towards achieving this result, the following expression can be derived for the optimum spark advance.

$$0.75KT = OSA/360 \times 60/RPM$$

or $$OSA = 4.5KT \times RPM$$

where:
- K = an empirical factor relating the measured time for the flame front to progress the distance d between the spark plug P1 and the ionization detector 244 and the actual burning time for the charge in the combustion chamber.
- T = the actual measured time required for the flame front to traverse the distance d from the spark plug P1 to the ionization detector 244.
- OSA = optimum spark advance.
- RPM = crankshaft revolutions per minute.

With regard to the above, the quantity OSA/360 represents the fraction of a revolution before top dead center during which burning occurs and the quantity 60/RPM represents the time of each revolution in seconds. The signal on line 252 representative of the desired spark advance is provided in accordance with the above relationship.

The summing amplifier 210 receives the sawtooth waveform on line 148 in addition to the spark advance signal on line 252 and provides a signal representative of the difference between the sawtooth waveform and the function generator output signal to a comparator 206 as previously described. Also, as previously described, the comparator 206 receives a signal from the terminal T1 of a voltage dividing resistor 204 and the periodic signal from the summing amplifier 210 and provides an output signal to the gate of an SCR at the appropriate time for firing the spark plug P1 of the first cylinder. The SCR discharges a capacitor in a CD system (not shown) through a coil C1 for the first spark plug P1.

The ionization detector 244 should be located as remotely as practical from the spark plug P1 so as to provide a long distance d so that the velocity of the flame front can be measured with the greatest possible accuracy. Additionally, the possibility that certain detonations will be unrecognized is reduced. With regard to the latter, should a detonation occur following firing of the spark plug P1, but before the flame front reaches the ionization detector 244, the detonation condition will be reflected in a measurement of an increased flame velocity and the spark advance will be suitably adjusted to retard the spark. However, should detonation occur subsequent to the time that the flame front reaches the ionization detector 244, the detonation will not be detected since an output signal from the flame detector 244 will already have been provided. Since the severity of a detonation is a function of the participating charge quantity, detonations occurring after the flame front passes the ionization detector 244, provided the ionization detector 244 is located as remotely from the spark plug P1 as possible, will be of a low order of severity and will not be consequential.

Although reference has been made to cylinders and cylinder chambers throughout the description of the present invention, it will be appreciated that the term "cylinder" should be given broader meaning so as to apply to any structure providing a combustion chamber receiving a charge which is ignited in accordance with a predetermined timing with respect to an operating cycle. For example, the ignition timing of a Wankel engine utilizing rotors and rotor chambers may be suitably controlled by the ignition systems of the present invention. Moreover, the term "top dead center" should be considered to be the time that contraction of the volume of a combustion chamber is terminated and expansion of the volume of the combustion chamber is initiated. Additionally, although a sawtooth waveform is utilized as a signal having a value which monotonically varies with at least a definable portion of the operating cycle of an engine, any other waveform may be used which is appropriately indicative of the elapse of at least a portion of the operating cycle of an engine. The period of the waveform may be established so as to be equal to a complete operational cycle of the engine, i.e. one in which all of the cylinders have been fired as described with respect to the embodiments of FIGS. 3A-3B and 4, or the period may be set to equal one or other integral number of the rotational increments between corresponding piston positions of successively fired cylinders. For example, the period may be equal to the rotational increment between the top-dead-center positions of the pistons for successively-fired cylinders, as described with respect to the embodiment of FIG. 1. Alternatively, the period may be established to equal an integral number of these increments between top-dead-center positions of the pistons of successively-fired cylinders.

While it will be apparent that the teachings herein are well calculated to teach one skilled in the art the method of making preferred embodiments of this invention, it will be appreciated that the invention is susceptible to modification, variation and change without departing from the proper scope of meaning of the subjoined claims.

What is claimed is:

1. In a multi-cylinder engine haivng an ignition system, single sensor means for detecting detonations in a plurality of cylinders of said engine, and electronic gating means having a gating period for time isolating an output signal from a signal stream emanating from said single sensor means such that said output signal is representative of either a detonating or a non-detonating condition in a specific one of said cylinders.

2. The invention according to claim 1, wherein said gating period for a specific cylinder begins after the generation of an ignition signal for said specific cylinder by said ignition system, and said individual gating period ends before the generation of another ignition signal by said ignition system.

3. The invention according to claim 2, wherein said individual gating period for a specific cylinder begins after the ignition of a charge in said specific cylinder by said ignition system, and said individual gating period ends before the generation of another ignition signal by said ignition system.

4. The invention according to claim 1, wherein said output signal is utilized to control the spark advance to at least one of said cylinders of said engine.

5. The invention according to claim 4, wherein said output signal is utilized to control the spark advance to the said one of said cylinders corresponding to said gating period.

* * * * *